US007227662B2

(12) United States Patent
Sugimoto et al.

(10) Patent No.: US 7,227,662 B2
(45) Date of Patent: Jun. 5, 2007

(54) CONTENTS MANAGING SYSTEM, CONTENTS MANAGING METHOD, AND PROGRAM

(75) Inventors: Mika Sugimoto, Asaka (JP); Tomoyuki Koshio, Yokohama (JP)

(73) Assignees: Fujifilm Co., Ltd, Tokyo (JP); Matsushita Electric Industrial Co., Ltd, Osaka (JP)

( * ) Notice: Subject to any disclaimer, the term of this patent is extended or adjusted under 35 U.S.C. 154(b) by 1042 days.

(21) Appl. No.: 10/255,948

(22) Filed: Sep. 27, 2002

(65) Prior Publication Data

US 2003/0076513 A1   Apr. 24, 2003

(30) Foreign Application Priority Data

Sep. 28, 2001   (JP)   ............ P.2001-302051

(51) Int. Cl.
   H04N 1/393   (2006.01)
   H04N 1/41   (2006.01)
   G06F 17/30   (2006.01)
   G06F 17/60   (2006.01)

(52) U.S. Cl. ............ 358/1.15; 358/1.2; 358/426.01; 705/27

(58) Field of Classification Search ............ 358/1.2, 358/1.9, 1.15, 400, 405, 407, 426.01, 443, 358/447; 379/100.13, 100.09; 705/26, 27
   See application file for complete search history.

(56) References Cited

U.S. PATENT DOCUMENTS

| 4,870,497 | A | * | 9/1989 | Chamzas et al. | ............ 358/447 |
| 4,873,577 | A | * | 10/1989 | Chamzas | ............ 358/447 |
| 4,924,521 | A | * | 5/1990 | Dinan et al. | ............ 382/254 |
| 5,949,551 | A | * | 9/1999 | Miller et al. | ............ 358/403 |
| 6,188,766 | B1 | * | 2/2001 | Kocher | ............ 358/405 |
| 7,092,118 | B2 | * | 8/2006 | Ferriere | ............ 358/1.2 |
| 7,095,522 | B2 | * | 8/2006 | Lauper et al. | ............ 358/1.15 |

* cited by examiner

*Primary Examiner*—Scott A. Rogers
(74) *Attorney, Agent, or Firm*—Birch, Stewart, Kolasch & Birch, LLP

(57) ABSTRACT

The present invention provides a contents managing system, a contents managing methods, and a program are provided, by which a communication fee required to distribute such contents which will not be probably utilized is reduced when contents are distributed via a network. An image owner performs a user registration with respect to an image managing server 2 by employing an image owner terminal. After the user registration, an image purchaser makes an order of an image with reference to a trial image produced by the image owner terminal. The image owner as to this ordered image uploads actual image data to the image managing server, whereas the image purchaser downloads the actual image data which is uploaded.

10 Claims, 10 Drawing Sheets

FIG.4

IMAGE SALES : IMAGE TRANSMISSION APPLICATION

| IMAGE | D : ¥MyPicture¥DSCF0012.JPG | REFERENCE |
| TITLE | SMILE |
| COMMENT | WELL-DRAWN CHARACTER |
| GENRE | CHARACTER ☑ |
| PRICE OF ACTUAL IMAGE | ¥ 300 ☑ |

PREVIEW

[ TRANSMIT ]  [ CANCEL ]

FIG.5

| IMAGE ID | TRIAL IMAGE 200×100 | 16-BIT COLOR 100×75 | 8-BIT COLOR 80×60 | 8-BIT COLOR 60×50 | 256 GRAY SCALE 80×60 |

FIG.9

| DELETE | THUMBNAIL | OWNER | PRICE |
|---|---|---|---|
| DELETE | ☺ | MIKA | 200 YEN |
| DELETE | ★ | SUGI | 100 YEN |

SHOPPING BASKET

TOTAL AMOUNT : 300 YEN
NAME : 
TELEPHONE NUMBER : 
MAIL ADDRESS :

MAKE ORDER   CANCEL

FIG.10

WE WOULD LIKE TO INFORM YOU OF RECEIVING YOUR ORDER.

ORDER RECEIVED DATE / TIME : 12h58m46s, AUGUST 15, 2001

NAME OF CUSTERMER : ★★★★★★

MAIL ADRESS OF CUSTERMER : #########

| ORDER | IMAGE ID | TITLE | STATUS OF ACTUAL IMAGE ON SERVER |
|---|---|---|---|
| 1 | xxxxx | SMILE | REGISTERED |
| 2 | xxxxx | MR. SMILE | NOT REGISTERED |

PLEASE CLICK THE FOLLOWING LINK, IF YOU TRY TO UPLOAD THE UNREGISTERED IMAGE TO THE SERVER.

[UPLOAD]

FIG.11

WE WOULD LIKE TO INFORM YOU THAT THE UPLOAD IS COMPLETED BASED ON YOUR ORDER AS FOLLOWS.

ORDER RECEIVED DATE / TIME : 12h58m46s, AUGUST 15, 2001

NAME OF CUSTERMER : ★★★★★★

MAIL ADRESS OF CUSTERMER : #########

| ORDER | IMAGE ID | TITLE |
|---|---|---|
| 1 | XXXXX | SMILE |
| 2 | YYYYY | MR. SMILE |

FIG.12

WE WOULD LIKE TO INFORM YOU THAT DAWNLOADING OF ORDERED IMAGE BECOMES POSSIBLE.

RECEIVING DAY / TIME : 15h30m33s, AUGUST 15, 2001

| ORDER | IMAGE ID | TITLE |
|---|---|---|
| 1 | XXXXX | SMILE |
| 2 | YYYYY | MR. SMILE |

PLEASE CLICK THE FOLLOWING LINK, IF YOU TRY TO DOWNLOAD THE IMAGE.

[DOWNLOAD]

FIG.13

SHOPPING BASKET

| DELETE | THUMBNAIL | OWNER | PRICE |
|---|---|---|---|
| DELETE | ☺ | MIKA | 200 YEN |
| DELETE | ★ | SUGI | 100 YEN |

TOTAL AMOUNT : 300 YEN
NAME : XXXXXXXX
TELEPHONE NUMBER : XXXXXXXXXXXX
MAIL ADDRESS : xxx@yyyzzz.com
CREDIT CARD NUMBER : ☐

[PURCHASE]  [CANCEL]

US 7,227,662 B2

CONTENTS MANAGING SYSTEM, CONTENTS MANAGING METHOD, AND PROGRAM

BACKGROUND OF THE INVENTION

1. Field of the Invention

The present invention is related to a contents managing system, a contents managing method, which manage data of contents, while having a purpose to distribute contents, and also related to a program for executing the contents managing method.

2. Description of the Related Art

Very recently, since data communication speeds of the Internet are largely increased, such data as images, moving pictures, and music can be downloaded without giving stress to users. As a result, contents services capable of selling and/or distributing the above-explained data on Web sites are gradually increased.

For instance, in conventional image sales services, images are sold in accordance with the following method. That is, when an image purchaser (image buyer) selects a desirable image on such a Web site that trial images such as images having lower resolution than that of actual images can be viewed, actual image data of this selected desirable trial image is distributed via the Internet and the like to this image purchaser. In these conventional image sales services, the trial images are produced from the actual images on the distribution side of the image data. As a consequence, image supply sources upload the actual image data of the image to be marketed to a server provided on the image data distributing side.

While all of these images which have been uploaded to the server provided on the image distributing side are not always purchased, there are some images which are not purchased at all. However, as to such images, the actual image data thereof should be uploaded to the server provided on the image distributing side in the conventional image sales services. As a result, there is a problem that an extra communication fee is required, since this extra communication fee is used to upload the actual image data of the images which are not actually purchased.

SUMMARY OF THE INVENTION

The present invention has been made to solve the above-described problem of the prior art, and therefore, has an object to provide a contents managing system, a contents managing method, and also, a program capable of executing the content managing system, by which when contents are distributed via a network, such a communication fee required to distribute such contents which will not be probably utilized can be reduced.

To solve the above-described problem, a contents managing system, according to an aspect of the present invention, is featured by such a contents managing system for managing data of contents in order to distribute the contents, comprising: a contents terminal having original data of contents, for producing trial data, the data size of which is smaller than that of the original data; and a contents managing server for storing thereinto the trial data of each of the contents transmitted from the contents terminal under such a condition that the transmitted trial data can be viewed, or heard by employing a communication terminal via a network; wherein: when the contents managing server accepts a distribution request of contents, the contents managing server requests the contents terminal having the original data as to the distribution-requested contents to transmit the original data to the contents managing server.

Also, a contents managing system, according to another aspect of the present invention, is featured by that in the case that the original data of the distribution-requested contents is transmitted from the contents terminal to the contents managing server, the contents managing server notifies such a fact that the original data of the contents can be downloaded to a communication terminal which issues the distribution request of the contents.

As previously explained, while the trail data whose data sizes are smaller than those of the original data have been stored in the contents managing server, when the distribution request of the contents is issued, if the transmission of the original data is required for the contents terminal having the original data of the requested contents, then the original data is transmitted to the contents managing server. As a consequence, this contents managing system can reduce the communication amount of the data which are transmitted from the contents terminal to the contents managing server, as compared with that of the conventional system for transmitting the original data of all of the contents containing such contents which are not probably used. As a result, the storage capacity of this contents managing server can be reduced.

Also, a contents managing system, according to another aspect of the present invention, is featured by that the contents terminal is comprised of: a computer capable of realizing both a trial data producing function for producing trial data having a different format from a format of the original data in a predetermined system based upon the original data of the contents, and also a trial data transmitting function for transmitting the produced trial data to the contents managing server by executing a program transmitted from the contents managing server.

As explained above, since the trial data is produced by the contents terminal, the load given to such a processing apparatus as a CPU of the contents managing server can be reduced, as compared with the conventional system in which the trial data is produced on the side of the contents managing server.

Also, a contents managing server, according to another aspect of the present invention, is featured by that the contents managing server produces display data which are suitable for the respective communication terminals and whose formats are different from the format of the trial data transmitted from the contents terminal, and the contents managing server judges a sort of a communication terminal connected to the contents managing server so as to transmit an optimum type of display data to the communication terminal. As a consequence, the display data can be displayed irrespective of the machine sort and the model type of the communication terminal.

Also, a contents managing method, according to another aspect of the present invention, is featured by such a contents managing method for managing data of contents so as to distribute the contents, comprising: a contents distribution request accepting step in which a contents managing server accepts a distribution request of contents, while the contents managing server stores thereinto the contents under such a condition that the contents can be viewed, or heard via a network by using a communication terminal, and the contents are indicated by trial data transmitted from a contents terminal which contains original data of the contents and produces the trial data whose format is different from a format of the original data; an original data transmission requesting step in which the contents managing server requests the contents terminal having the original data of the distribution-requested contents to transmit the original data to the contents managing server; an original data transmitting step in which the contents terminal transmits the original data to the contents managing server; and a down-loadable information notifying step in which the contents managing server notifies such an information that the original data of the contents can be downloaded to a communication terminal which issues a distribution request of the contents.

Also, a contents managing method, according to another aspect of the present invention, is featured by that the contents terminal includes: a trial data producing step for producing trial data having a different format from a format of the original data in a predetermined system based upon the original data of the contents; and a trial data transmitting step for transmitting the produced trial data to the contents managing server by executing a program transmitted from the contents managing server by a computer.

Furthermore, a program, according to a further aspect of the present invention, is featured by such a program wherein: the program causes a computer to execute both a trial data producing function for producing trial data having a different format from a format of original data in a predetermined system based upon the original data of contents, and also a trial data transmitting function for transmitting the produced trial data.

BRIEF DESCRIPTION OFF THE DRAWINGS

FIG. 4 shows an example of a display screen of an image owner terminal 4a when an image transmission application is started;

Figure 6:
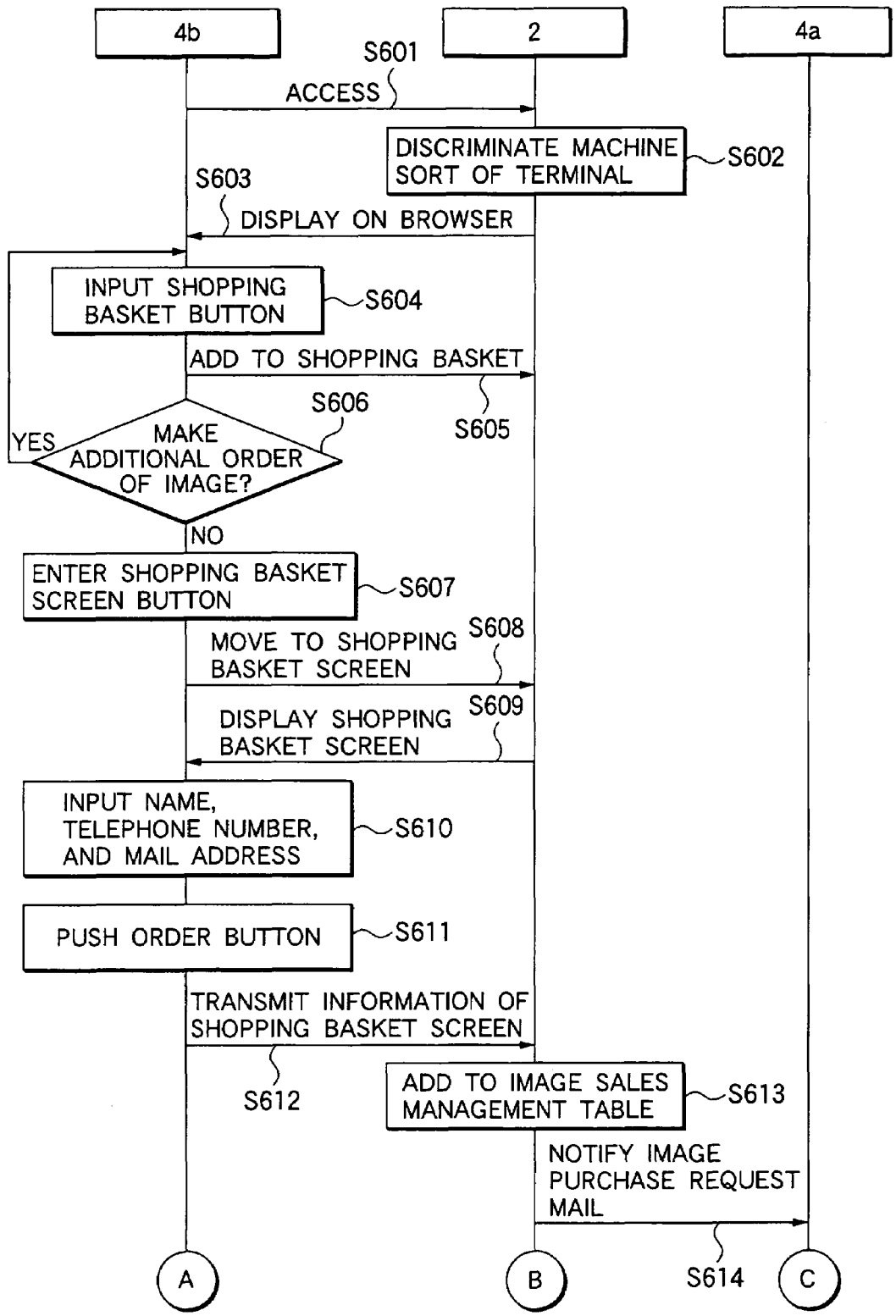
Figure 7:
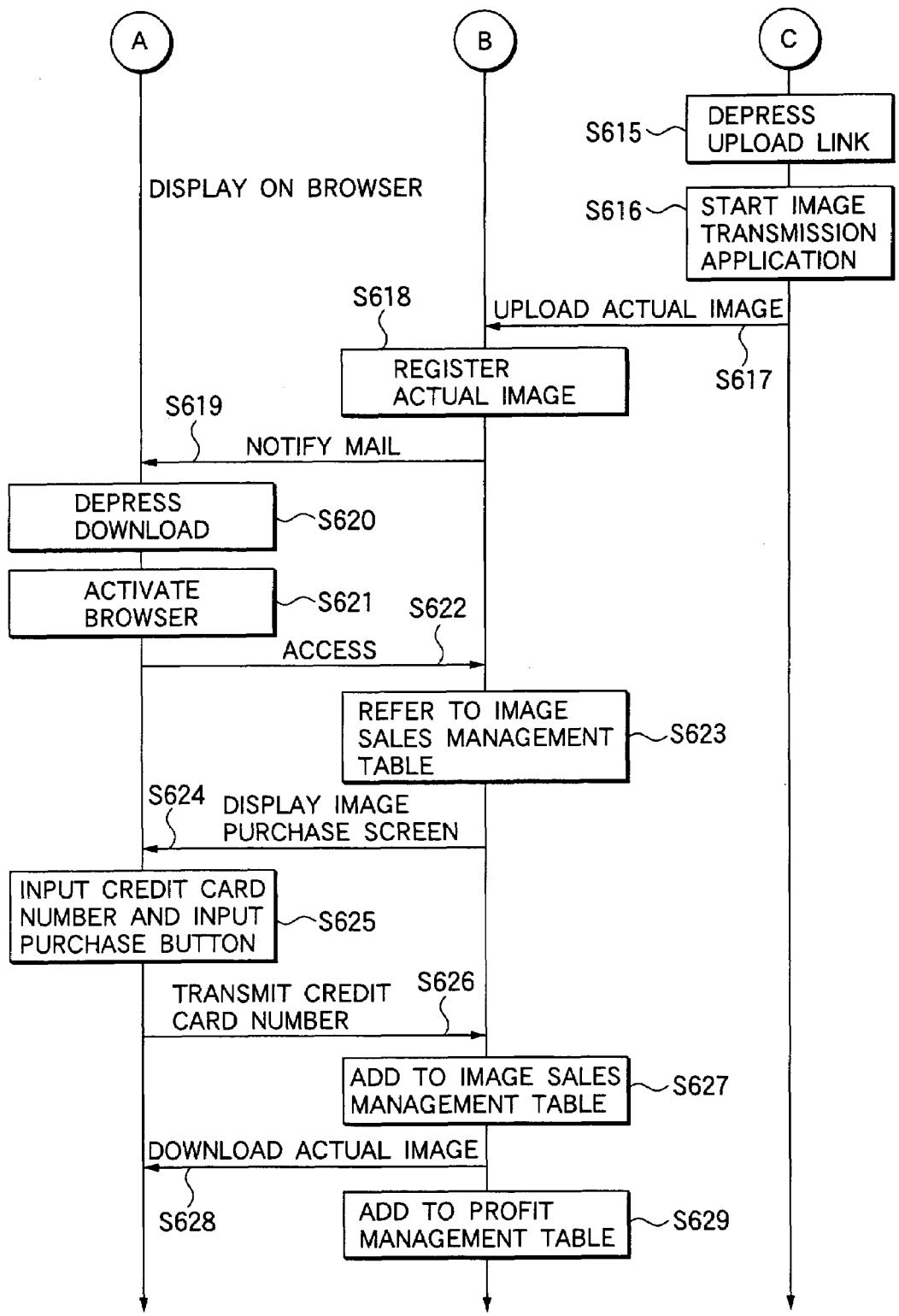
Figure 8:
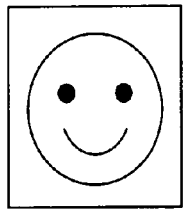

FIG. 5 indicates one example of an image contents list;

FIG. 6 is a sequence chart for explaining process operations executed until a transaction between an image purchaser and an image owner;

FIG. 7 is a sequence chart for explaining process operations executed until a transaction between an image purchaser and an image owner;

FIG. 8 shows one example of an image sales screen displayed on an image purchaser terminal 4b;

FIG. 9 indicates one example of a view basket;

FIG. 10 indicates one example of an image purchase request notification mail;

FIG. 11 shows another example of an image purchase request notification mail;

FIG. 12 represents an example of a down-loadable information notification mail; and FIG. 13 indicates an example of an image purchase screen.

In the drawings, the reference numeral 1 to a contents managing system; 2 to an image managing server; 3 to an network; 4a to an image owner terminal; and 4b to an image purchaser terminal.

DETAILED DESCRIPTION OF THE PREFERRED EMBODIMENTS

Figure 1:
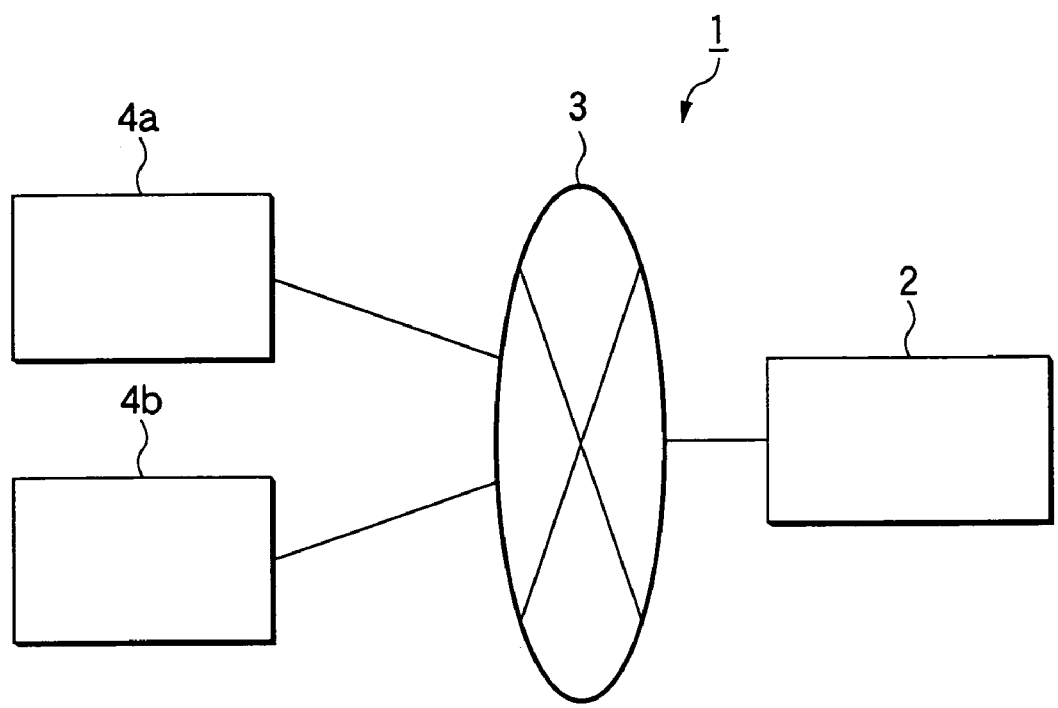
FIG. 1 is a structural diagram for indicating a contents managing system according to an embodiment mode of the present invention.

Referring now to drawing, various embodiment modes of a contents managing system according to the present invention will be described in detail. The below-mentioned contents managing system is directed to manage data of contents, while having a purpose to distribute contents such as images. FIG. 1 indicates an arrangement of a contents managing system 1 according to one embodiment mode of the present invention.

The contents managing system 1 indicated in this drawing is provided with an image managing server 2 and a communication terminal 4. The image managing server 2 manages image data, and corresponds to a contents managing server defined in a scope of claim for a patent. The communication terminal 4 is a portable telephone, a personal computer, a PDA (portable information terminal), or the like. This communication terminal 4 is capable of transmitting/receiving image data via a network 3 such as the Internet, and is capable of viewing images via this communication terminal 4. In the below-mentioned description, for the sake of convenience, it is so assumed that such a communication terminal 4 of an image owner who owns actual image data of an image is recognized as an image owner terminal 4a (corresponding to "contents terminal" defined in scope of claim for patent), whereas a communication terminal 4 of an image purchaser (image buyer) who views and/or purchases an image sold by an image owner is recognized as an image purchaser terminal 4b (corresponding to "communication terminal" defined in scope of claim for patent). Also, although one set of the image owner terminal 4a and one set of the image purchaser terminal 4b are indicated in FIG. 1, plural sets of these terminals 4a and 4b may be alternatively provided.

A storage memory (not shown) is provided in the image managing server 2. The storage memory stores thereinto a user management table, a profit management table, an image information management table, an image sales management table, and an image transmission application program. The user management table is used to manage personal information as to image owners. The profit management table is to manage sales profits of the image owners. The image information management table is used to manage image information of the image owners. The image sales management table is employed to manage order contents and personal information of image purchasers (buyers). The image transmission application program contains image process information, transmission destination server information, and server additional information. Also, the image transmission application program owns an image processing function (trial data producing function) and a data transmitting function (trial data transmitting function), and also corresponds to a program executable by the image owner terminal 4a (communication terminal 4). The image processing function is used to produce trial images from actual images which are sold by image owners. The data transmitting function is used to transmit image information, personal information, and the like to the image management server 2.

Next, a description is made of operations (namely, contents managing method) of the contents managing system 1 indicated in FIG. 1. As an entire operation flow, after an image owner firstly executes a user registration by using the image owner terminal 4a, a trial image is produced from an actual image by the image owner terminal 4a, and then, the trial image data is transmitted to the image managing server 2. When an image purchaser (image buyer) views the trial image and makes an order for an image, the image managing server 2 instructs an image owner (namely, image owner terminal 4a) of the image, who has received this order, to transmit actual image data. When the actual image data is transmitted, the image managing server 2 notifies such a fact that the ordered image can be downloaded to the image purchaser (namely, image purchaser terminal 4b). Finally, the image purchaser downloads the actual image data of the ordered image, so that a series of process operations is accomplished.

Figure 2:
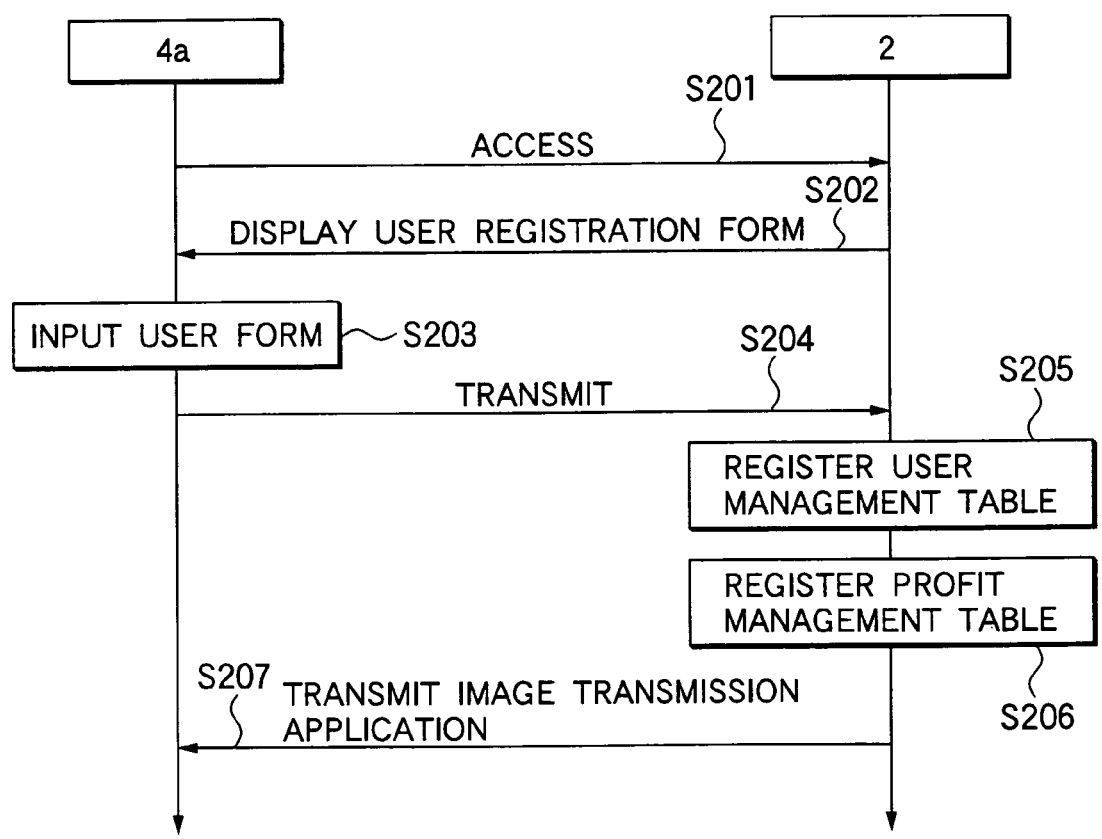
FIG. 2 is a sequence chart for explaining process operations executed when an image owner performs user registration.

Subsequently, a sequential operation executed when an image owner performs a user registration will now be explained in detail with reference to FIG. 2. FIG. 2 is a sequence chart in the case that the image owner performs the user registration. First, the image owner accesses from the image owner terminal 4a via the network 3 to the image managing server 2 (S201). The image managing server 2 displays such a form on the image owner terminal 4a, while this form is used to input, or enter items indicated in a table 1, e.g., a user ID, a nickname, a name, an address, a telephone number, an e-mail address, a terminal type or name in use, an OS type or name in use, a credit number for settlement, and a number of bank account for money deposition (S202). After the image owner enters the respective items (S203), when the information of these entered items is transmitted to the image managing server 2 (S204), the image managing server 2 forms a user management table containing the above-described items, and then, registers this formed user management table into the storage memory (S205).

TABLE 1

USER MANAGEMENT TABLE

<ITEM>

USER ID
NICKNAME
NAME
ADDRESS
TELEPHONE NUMBER
E-MAIL ADDRESS
TERMINAL TYPE OR NAME IN USE
OS TYPE OR NAME IN USE
CREDIT CARD NUMBER
NUMBER OF BANK ACCOUNT FOR MONEY DEPOSITION

It should be noted that in the user managing table shown in the table 1, an ID (identification) code specific to the image owner is inputted into the item "user ID", and a name which is opened as the image owner is entered into the item "nickname." Also, a sort of terminal which uses the image transmission application program is selected from a list of corresponding machine sorts, and then, selected terminal sort is entered into the item "terminal type or name." An OS (operating system) which is used in the image owner terminal 4a is selected, and then, the selected OS is entered into the item "OS type or name in use." A credit card number which is used to settle a server use fee with respect to a managing party of the image management server 2 is entered into the item "credit card number." Furthermore, a bank account number which is used to deposit a sales profit gained when an image is sold is entered into the item "number of bank account of money deposition."

Next, the image managing server 2 forms a profit management table, and then, registers this formed profit management table into the storage memory (S206). The profit management table contains various items such as a user ID, a total money amount, and a path of a log file, which are listed in the below-mentioned table 2. It should also be noted that in the profit management table shown in the table 2, the item "user ID" is similar to the item "user ID" of the user management table (table 1), and the item "total money amount" indicates a total money amount of images which are sold during a predetermined time period. Also, the item "path of log file" shows a storage place of a file in which a log is saved. This log is related to such images which have been sold from the user registration up to now.

TABLE 2

PROFIT MANAGEMENT TABLE

<ITEM>

USER ID
CUMULATIVE TOTAL MONEY AMOUNT
PATH OF LOG FILE

When the user registration is completed in the above-described manner, the image transmission application program executable in the image owner terminal 4a is transmitted from the image managing server 2 to the image owner terminal 4a (S207). This image transmission application program includes trial image production information, image transmission destination information, an image genre (category) list, an image price list, and an applied user ID.

Figure 3:
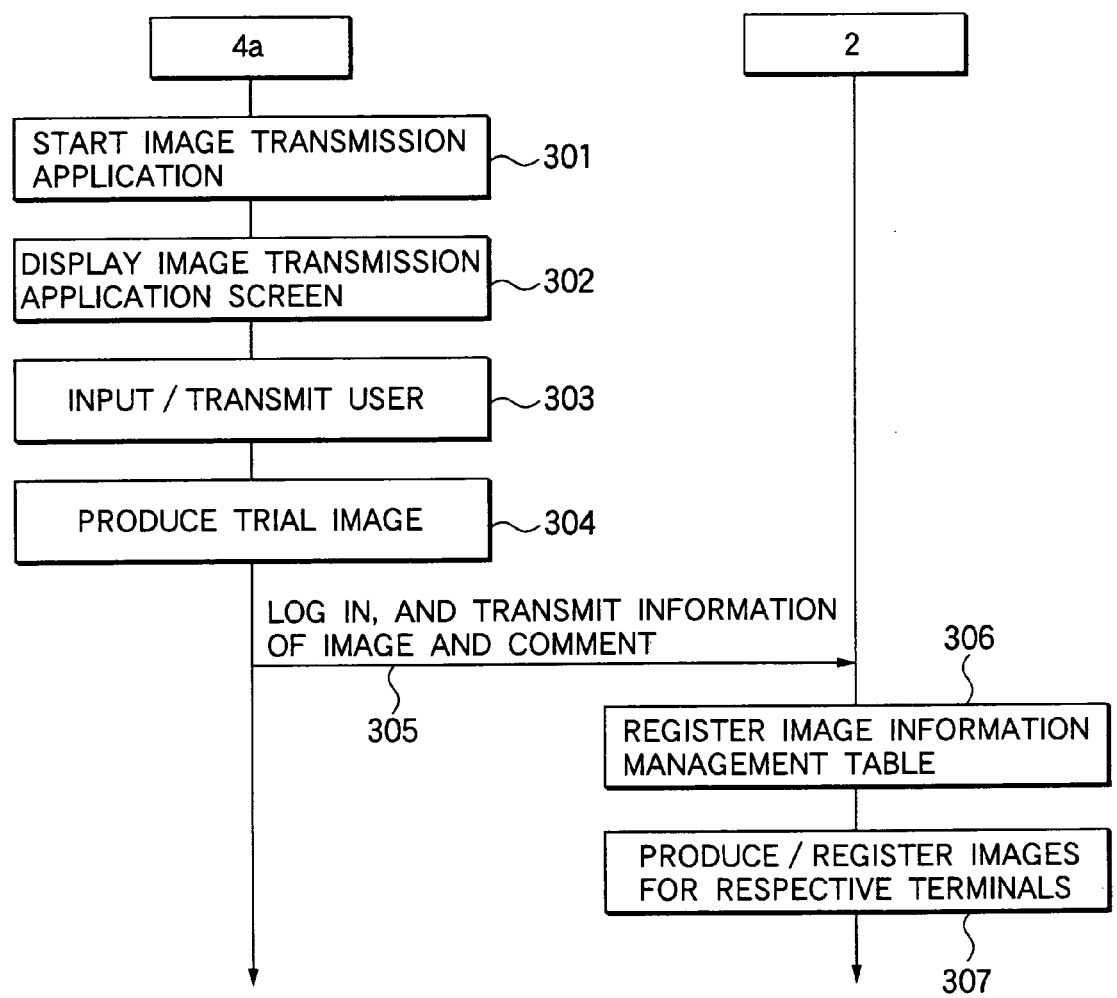
FIG. 3 is a sequence chart for describing process operations executed until a selling image is registered into an image managing server 2.

Next, a detailed description will now be made of a sequence operation executed until a marketing image stored in the image owner terminal 4a is registered into the image managing server 2 with reference to FIG. 3. FIG. 3 is a sequence chart for explaining process operations until the marketing image is registered into the image managing server 2. First, when the image owner starts the image transmission application program by using the image owner terminal 4a (S301), such a screen is displayed on the display unit of the image owner terminal 4a (S302). This screen is used to input, or select both a pre-view and path information of an actual image which is scheduled to be marketed, an image title, a comment on an image, a genre, and a price of an image to be registered. FIG. 4 indicates an example of the display screen at this time.

Next, the image owner inputs both the title and the comment by using the image owner terminal 4a, and selects the image genre and the price of the actual image from the list. Thereafter, when the image owner depresses a "transmit" button (S303), the image transmission application program is executed so as to produce a trial image from the actual image in accordance with the trial image processing information (S304), and then, the trial image data, the title, the comment, and the price of the actual image are transmitted to the image managing server 2 by utilizing the data transmission function of the image transmission application program (S305).

When the image managing server 2 receives this information, the image managing server 2 applies an image ID to the trial image, and forms an image information management table, and then registers this image information management table into the storage memory (S306). The formed image information table contains such items as an image ID, a user ID, a title, a comment, a genre, a price of an actual image, and path information of the actual image, which are represented in the below-mentioned table 3. It should also be noted that in the image information management table shown in the table 3, the item "user ID" is similar to the user ID of the user management table (table 1), and an item "registration day/time" corresponds to such day/time when the image managing server 2 registers the trial image.

TABLE 3

IMAGE INFORMATION MANAGEMENT TABLE

<ITEM>

IMAGE ID
USER ID
REGISTRATION DAY/TIME
TITLE
COMMENT
GENRE
PRICE
PATH INFORMATION AS TO ACTUAL IMAGE

When the image information management table is registered into the storage memory, the image managing server 2 automatically produces images having sizes and formats, which are optimized with respect to various sorts of terminals, from the trial image transmitted from the image owner terminal 4a in order that the automatically produced images can be displayed on proper screens in response to various sorts of image purchaser terminals 5a (personal computer, portable telephone, PDA etc.). The images which are automatically produced are classified with respect to each of sizes and resolution. Then, the classified images are registered as one set of image contents, for instance, as indicated in FIG. 5 (S307).

Next, a sequence operation executed until transactions between an image purchaser and an image owner are accomplished will now be described in detail with reference to FIG. 6 and FIG. 7. FIG. 6 and FIG. 7 are sequence charts for describing process operations until the transactions between the image purchaser and the image owner are ended. First, the image purchaser accesses the image managing server 2 by employing the image purchaser terminal 4b (S601). The image managing server 2 discriminates the image purchaser terminal 4b (S602), and displays both a trial image optimized to this discriminated terminal and an image sales screen on the image purchaser terminal 4b (S603). The image sales screen contains a comment, a title, a price, and an image owner. FIG. 8 shows an example of the image sales screen which is displayed on the image purchase terminal 4b.

In the case that the image purchaser wishes to purchase an image, since the image purchaser pushes an "enter into shopping basket" button shown in FIG. 8 (S604), an image which is scheduled to be purchased is temporarily recorded into the image managing server 2 (S605). Furthermore, in the case that the image purchaser wants to make an order for an image (YES: S606), the image purchaser repeatedly performs the process operation of the above-described step 604. In the case that the image purchaser determines all of images which are scheduled to be purchased and makes an order for these images, this image purchaser pushes a "view basket button" shown in FIG. 8 (S607). When the "view basket button" is depressed, the image purchaser terminal 4b notifies such a fact that the "view basket button" is depressed to the image managing server 2 (S608). As a result, such a "view basket" as indicated in FIG. 9 is displayed on the display unit of the image purchaser terminal 4b (S609).

On the "view basket", the trial image, the owner, the price, and the total money amount are displayed which are selected by the image purchaser, and furthermore, a column is displayed, while this column is employed so as to input a name, a telephone number, and an e-mail address of the image purchaser. It should be understood that when an order of a selected image which is wanted to be purchased is canceled, a "delete" button may be merely depressed. When the image purchaser inputs the name, the telephone number, and the e-mail address into "view basket" shown in FIG. 9 (S610), and then, pushes "ordering button" (S611), information as to the shopping basket shown in FIG. 9 is transmitted to the image managing server 2 (S612). Upon receipt the shopping basket information, the image managing server 2 forms an image sales management table, and then registers this formed image sales management table into the storage memory (S613). This image sales management table contains such items as an order ID, an order day/time, a name, a telephone number, an e-mail address, an order flag, a credit card number, a total purchase money amount, and a purchased image ID, which are indicated in the following table 4. The ordering operation may be accomplished in this manner.

TABLE 4

IMAGE SALES MANAGEMENT TABLE

<ITEM>

ORDER ID
ORDER DAY/TIME
NAME
TELEPHONE NUMBER
E-MAIL ADDRESS
ORDER FLAG
CREDIT CARD NUMBER
TOTAL PURCHASE MONEY AMOUNT
PURCHASE IMAGE ID

It should be noted that in the image sales management table indicated in the table 4, the item "order ID" corresponds to identification information which is applied to a single order, and the item "order day/time" corresponds to day/time on which an order is accepted. Also, the items of "name", "telephone number", and "e-mail address" are such items which are inputted by the image purchaser on "view basket" shown in FIG. 9. Also, the item "order flag" corresponds to a flag which indicates a process state with respect to an order. Also, the item "credit card number" corresponds to such a credit card number used to settle a purchased image fee from an image purchaser. Furthermore, the item "purchase image ID" corresponds to identification information which is applied to each of purchased images.

In the case that the actual image data of the image ordered by the image managing server 2 is not present in the image contents shown in FIG. 5, namely in such a case that the above-described actual image data is not stored in the image managing server 2, the image managing server 2 transmits an image purchase request notification mail for notifying that a purchase request of the image is issued to the image owner terminal 4a which holds the above-explained actual image data. FIG. 10 represents an example of the image purchase request notification mail. In the case that the image owner terminal 4a receives the image purchase request notification mail and executes an uploading operation of actual image data, the image owner depresses an "upload link" button contained in the image purchase request notification mail shown in FIG. 10 (S615).

It should also be understood that the "upload link" button contains both such information by which the image transmission application program is automatically started in the image owner terminal 4a, and also, the path information to the actual image which is registered in the image register management table shown in the table 3. As a result, since the image owner depresses the "upload link" button, the image transmission application program is automatically started (S616), and thus, the actual image data of the purchase-requested image may be uploaded to the image managing server 2 (S617). The image managing server 2 adds the received actual image data to the image contents shown in FIG. 5 so as to manage this actual image data (S618). Also, in the case that the actual image data has already been uploaded within the image contents shown in FIG. 5, the process operations defined from the step S614 up to the step S618.

It should also be noted that when the image owner terminal 4a receives the image purchase request notification mail, even if the image owner does not depress the "upload link" button, then the image owner terminal 4a may alternatively commence to automatically upload the actual image data. In this alternative case, it is so assumed that the image purchase request notification mail received by the image owner terminal 4a has such a mail content that "since the image purchase request is issued, the image data is uploaded." FIG. 11 shows an example of the image purchase request notification mail in this alternative case. Since such an alternative process operation is carried out, a time duration required when the order is issued by the image purchaser until the actual image data is uploaded to the image managing server 2 may be shortened.

Subsequently, the image managing server 2 transmits a down-loadable information notification mail to the image purchaser terminal 4b (S619), while this down-loadable information notification mail indicates such a fact that downloading operation of an image can be carried out. FIG. 12 shows an example of the down-loadable information notification mail. When a "download" button contained in the down-loadable information notification mail is depressed (S620), a browser is automatically started (S621), and the image purchaser terminal 4b accesses the image managing server 2 (S622). While the image managing server 2 refers to the image sales management table shown in the table 4 (S623), "image purchase screen (shopping basket)" is displayed on the image purchaser terminal 4b (S624). This "image purchase screen" corresponds to such a screen that an input column of a credit card number is additionally provided with "view basket" indicated in FIG. 9. FIG. 13 shows an example of the image purchase screen.

On the image purchase screen shown in FIG. 13, the image purchaser confirms both the purchased image and the total price, and enters the number of the credit card for settling the transaction. Then, when the image purchaser depresses "purchase button" (S625), this credit card number is transmitted to the image managing server 2 (S626) and then is registered in the item of the credit card number of the image sales management table shown in the table 4 (S627). Then, the downloading operation of the actual image data of the ordered image is commenced (S628).

When the downloading operation of the actual image data is commenced, a portion of the total money amount as to the sold images is added as an image management fee to an item of a cumulative total money amount of a profit management table for a manager, and the remaining amount thereof is added to a cumulative total money amount of a profit management table of an image owner (S629). The profit management table for the manager owns a similar content to that of the profit management table shown in the table 2, and the user ID thereof corresponds to an ID of the manager.

It should be noted that in the image managing server 2, the cumulative total money amount contained in the profit management table is checked once every month. At this time, while the checked cumulative total money amount is compared with the server use fee of the image managing server 2, if the cumulative total money amount is greater than the server use fee, then such a money amount calculated by subtracting the server use fee from the cumulative total money amount is deposited via a bank server (not shown) into the bank account (namely, number of bank account for money deposition shown in table 1) which is designated in the user management table. On the other hand, if the cumulative total money amount is less than the server use fee, then such a money amount calculated by subtracting the cumulative total money amount from the server use fee is withdrawn via the bank server based upon the credit card number (namely, credit card number shown in table 1) designated in the user management table.

Alternatively, at a time instant when the downloading operation of the image ordered by the image purchaser is ended, the actual image data of the ordered image may be automatically deleted from the image management server 2. In this alternative case, since image data which has been once uploaded in the image management server 2 is not left in the image management server 2, a storage capacity of a hard disk and the like may be saved which is used to store thereinto the image data owned by the image managing server 2.

Also, in the above-described embodiment mode, the sales example as to the image has been exemplified. However, the present invention is not limited to the above example, but may be applied to texts, music, or moving pictures. For example, in the case that music and moving pictures are sold, in accordance with a contents transmission application program (corresponding to image transmission application program) of a data owner terminal, a partial data thereof, e.g., a first 1 MB (mega bytes)—data portion may be automatically derived from the music data, or the moving picture data so as to produce trial data. Alternatively, a total data size of the music data, or the moving picture data may be compressed so as to produce trial data thereof.

As previously described in detail, in accordance with both the contents managing system and the contents managing method according to this embodiment mode, while the image transmission application program transmitted to the image owner terminal 4a is utilized so as to produce the trial image from the actual image, the actual image data is newly uploaded to the image managing server 2 when the image purchaser who has viewed the produced trial image requests to purchase this actual image. As a result, with respect to the transmission of the actual image data to the image managing server 2, only necessary actual images (namely, ordered images) may be transmitted to the image managing server 2, so that the communication fee required to transmit the actual image data can be suppressed.

Also, in this embodiment mode, an image received in the image managing server 2 is converted into such an image having a size and a format, which are optimized with respect to a model sort and a machine sort of the image purchaser terminal 4b (personal computer, portable telephone, portable information terminal etc.). As a consequence, the trial images can be displayed without having any limitation on the model sort and the machine sort of the image purchaser terminal 4b.

Furthermore, in this embodiment mode, even when a large amount of images is ordered within one time from a plurality of image purchasers, these plural image purchasers cannot download the ordered actual images after the image owner has uploaded these actual images. When the image purchasers want to purchase the images, the image owner does not always upload the actual images. As a consequence, there is a time difference after the order has been made until the actual image can be downloaded. In other words, even when a large amount of images are ordered, within one time, there is no chance that the image managing server 2 should accept a large number of image download requests. As a consequence, the work load of the CPU (center processing unit) of the image managing server 2 can be reduced.

As previously explained, in accordance with the contents managing system, the contents managing method, and the program of the present invention, while the trail data whose data sizes are smaller than those of the original data have been stored in the contents managing server, when the distribution request of the contents is issued, if the transmission of the original data is required for the contents terminal having the original data of the requested contents, then the original data is transmitted to the contents managing server. As a consequence, the communication amount of the data which are transmitted from the contents terminal to the contents managing server can be reduced, as compared with that of the conventional system for transmitting the original data of all of the contents containing such contents which will not be probably used. As a result, the storage capacity of this contents managing server can be reduced.

What is claimed is:

1. A contents managing system for managing data of contents in order to distribute the contents, comprising:
    a contents terminal including original data of contents and producing trial data whose data size is smaller than that of the original data; and
    a contents managing server for storing the trial data of each of the contents transmitted from the contents terminal in the contents managing server under such a condition that the transmitted trial data can be viewed, or heard by employing a communication terminal via a network, wherein,
    when the contents managing server accepts a distribution request of contents from the communication terminal, the contents managing server requests the contents terminal, which includes the original data as to the distribution-requested contents, for transmitting the original data to the contents managing server.

2. The contents managing system according to claim 1, wherein, in the case that the original data of the distribution-requested contents is transmitted from the contents terminal to the contents managing server, the contents managing server notifies such a fact that the original data of the contents can be downloaded to the communication terminal which issues the distribution request of the contents.

3. The contents managing system according to claim 1, wherein the contents terminal includes:
    a computer for realizing both a trial data producing function for producing trial data having a different format from a format of the original data in a predetermined system based upon the original data of the contents, and
    a trial data transmitting means for transmitting the produced trial data to the contents managing server by executing a program transmitted from the contents managing server.

4. The contents managing system according to claim 2, wherein the contents terminal includes:
    a computer for realizing both a trial data producing function for producing trial data having a different format from a format of the original data in a predetermined system based upon the original data of the contents, and
    a trial data transmitting means for transmitting the produced trial data to the contents managing server by executing a program transmitted from the contents managing server.

5. The contents managing system according to claim 1, wherein the contents managing server produces display data which are suitable for the respective communication terminals and whose formats are different from the format of the trial data transmitted from the contents terminal, and the contents managing server judges a sort of the communication terminal connected to the contents managing server so as to transmit an optimum type of display data to the communication terminal.

6. The contents managing system according to claim 2, wherein the contents managing server produces display data which are suitable for the respective communication terminals and whose formats are different from the format of the trial data transmitted from the contents terminal, and
    the contents managing server judges a sort of the communication terminal connected to the contents managing server so as to transmit an optimum type of display data to the communication terminal.

7. The contents managing system according to claim 3, wherein the contents managing server produces display data which are suitable for the respective communication terminals and whose formats are different from the format of the trial data transmitted from the contents terminal, and
    the contents managing server judges a sort of the communication terminal connected to the contents managing server so as to transmit an optimum type of display data to the communication terminal.

8. A contents managing method for managing data of contents so as to distribute the contents, comprising the steps of:
    accepting a contents distribution request, wherein, in the step of accepting, a contents managing server accepts a contents distribution request, which is transmitted from a communication terminal;
    requesting an original data transmission, wherein, in the step of requesting, the contents managing server requests to a contents terminal having the original data of the distribution-requested contents for transmitting the original data to the contents managing server;
    transmitting of original data, wherein, in the step of transmitting, the contents terminal transmits the original data to the contents managing server; and
    notifying of down-loadable information, wherein, in the step of notifying, the contents managing server notifies the fact that the original data of the contents can be downloaded to the communication terminal, which issues a distribution request of the contents, wherein
    the contents managing server stores thereinto the contents under such a condition that the contents can be viewed, or heard via a network by using a communication terminal, and
    the contents are indicated by trial data transmitted from a contents terminal which contains original data of the contents and produces the trial data whose format is different from a format of the original data.

9. The contents managing method according to claim 8, further comprising the steps of:

trial data producing for producing trial data having a different format from a format of the original data in a predetermined system based upon the original data of the contents; and trial data transmitting for transmitting the produced trial data to the contents managing servers, wherein the both steps of trial data producing and trial data transmitting are executed at the contents terminal based on a program transmitted from the contents managing server.

10. A computer program product comprising a recording medium, having encoded thereon a computer readable program executable by a computer for managing data of contents so as to distribute the contents by carrying out the functions of:

accepting a contents distribution request, wherein, in the step of accepting, a contents managing server accepts a contents distribution request, which is transmitted from a communication terminal;

requesting an original data transmission, wherein, in the step of requesting, the contents managing server requests to a contents terminal having the original data of the distribution-requested contents for transmitting the original data to the contents managing server;

transmitting of original data, wherein, in the step of transmitting, the contents terminal transmits the original data to the contents managing server; and notifying of down-loadable information, wherein, in the step of notifying, the contents managing server notifies the fact that the original data of the contents can be downloaded to the communication terminal, which issues a distribution request of the contents, wherein the contents managing server stores thereinto the contents under such a condition that the contents can be viewed, or heard via a network by using a communication terminal, and the contents are indicated by trial data transmitted from a contents terminal which contains original data of the contents and produces the trial data whose format is different from a format of the original data.

* * * * *